(12) United States Patent
Tanaka

(10) Patent No.: US 12,109,507 B2
(45) Date of Patent: Oct. 8, 2024

(54) WIRELESS CONTROLLED AIRPLANE AND ARITHMETIC PROCESSING DEVICE

(71) Applicant: Futaba Corporation, Mobara (JP)

(72) Inventor: Masahiro Tanaka, Mobara (JP)

(73) Assignee: Futaba Corporation, Mobara (JP)

( * ) Notice: Subject to any disclaimer, the term of this patent is extended or adjusted under 35 U.S.C. 154(b) by 372 days.

(21) Appl. No.: 17/500,670

(22) Filed: Oct. 13, 2021

(65) Prior Publication Data

US 2022/0119108 A1 Apr. 21, 2022

(30) Foreign Application Priority Data

Oct. 15, 2020 (JP) ................................ 2020-173974

(51) Int. Cl.
| | |
|---|---|
| *B64C 39/02* | (2023.01) |
| *A63H 27/00* | (2006.01) |
| *A63H 30/04* | (2006.01) |
| *B64C 9/06* | (2006.01) |
| *B64U 10/25* | (2023.01) |
| *B64U 20/80* | (2023.01) |

(52) U.S. Cl.
CPC ............. *A63H 27/02* (2013.01); *A63H 30/04* (2013.01); *B64U 10/25* (2023.01); *B64U 20/80* (2023.01); *B64U 2201/20* (2023.01)

(58) Field of Classification Search
CPC .... A63H 27/02; A63H 30/04; B64U 2201/20; B64U 10/25; B64U 20/80
See application file for complete search history.

(56) References Cited

U.S. PATENT DOCUMENTS

| | | | | |
|---|---|---|---|---|
| 2014/0312824 | A1* | 10/2014 | Beard .................... | G05B 5/01 |
| | | | | 318/581 |
| 2016/0062355 | A1* | 3/2016 | Saegusa ................ | A63H 30/04 |
| | | | | 701/2 |

OTHER PUBLICATIONS

Merriam, Rudy; Flying With Proportional—Integral—Derivative Control; May 18, 2016; https://hackaday.com/2016/05/18/flying-with-proportional-integral-derivative-control/.*

* cited by examiner

*Primary Examiner* — Brian P Sweeney
(74) *Attorney, Agent, or Firm* — Quarles & Brady LLP

(57) ABSTRACT

An objective of the present invention is to eliminate unnatural behaviors of a wireless controlled airplane during PID control. In a wireless controlled airplane, a receiving section receives a first operation signal for a first actuator, a second operation signal for a second actuator, and a third operation signal for a third actuator, wherein the first, second and third operation signals are provided as operation signals wirelessly transmitted. A first actuator control section is configured to generate an actuation signal for the first actuator by means of PID control depending on the first operation signal, and to reduce an integral element in the PID control depending on an operation value for the second or third operation signal. Alternatively, the first actuator control section is configured to perform switching to a control without an integral element from the PID control.

6 Claims, 5 Drawing Sheets

WIRELESS CONTROLLED AIRPLANE AND ARITHMETIC PROCESSING DEVICE

CROSS-REFERENCE TO RELATED APPLICATION

This application claims the priority benefit of Japanese Patent Application No. 2020-173974 filed Oct. 15, 2020, which is fully incorporated herein by reference.

BACKGROUND OF THE INVENTION

Technical Field

The present invention relates to technical fields of a wireless controlled airplane configured to be controlled via wireless communication, and of an arithmetic processing device for a wireless controlled airplane.

Background Art

For example, wireless controlled airplanes are known which perform a flight via wireless communication based on operation of a control device. Patent Document 1 as listed below discloses a wireless controlled airplane configured to be controlled via wireless communication, wherein the wireless controlled airplane includes an aileron, elevator and rudder configured to be driven to control a pose and/or flight direction of an airframe.

CITATION LIST

Patent Literature

Patent Document 1: JP 2016-052401 A

SUMMARY OF THE INVENTION

In order to stabilize an airframe during a flight, some of wireless controlled airplanes have e.g. an angular speed detecting section (gyroscope) installed therein, wherein the angular speed detecting section detects rotation around each of a yaw axis, pitch axis and roll axis to control an aileron, rudder and elevator depending on these rotations. In this case, PID (Proportional-Integral-Derivative) control may be performed, i.e. control including P (proportional element), I (integral element) and D (derivative element), to enhance a pose maintenance ability for the airframe.

However, PID control may render the flight behavior unnatural which makes the control difficult. For example, when performing the PID control for the rudder, a course adjustment of a straight flight may be difficult after turning, and/or the wireless controlled airplane may take a course which is not intended by an operator, for cancellation of a so-called weathercock stability during the straight flight. Undertaking such phenomena into account, an objective of the present invention is to maintain a pose maintenance ability with the PID control, while preventing unnatural behaviors.

A wireless controlled airplane according to the present invention includes a receiving section configured to receive a first operation signal for a first actuator, a second operation signal for a second actuator, and a third operation signal for a third actuator, wherein the first, second and third operation signals are provided as operation signals wirelessly transmitted, wherein the wireless controlled airplane further includes a first actuator control section configured to generate an actuation signal for the first actuator by means of PID control, wherein the first actuator control section is configured to reduce an integral element in the PID control depending on an operation value for the second operation signal or third operation signal. An arithmetic processing device according to the present invention includes at least the first actuator control section as described above. For example, PID control shall be considered which is performed for a wireless controlled airplane which includes an actuator for each of a rudder, aileron and elevator. In this case, when an operation signal for an actuator (second or third actuator) is received, an integral element (control amount by an I-term) in the PID control for another actuator (first actuator) is reduced.

Furthermore, a wireless controlled airplane according to the present invention may include the receiving section and the first actuator control section similarly to the above-described wireless controlled airplane, wherein the first actuator control section may be configured to perform switching to a control without an integral element from the PID control depending on operation of the second operation signal or third operation signal. Similarly, an arithmetic processing device according to the present invention may include such a first actuator control section. For example, when an operation signal for an actuator (second or third actuator) is received, the PID control for another actuator (first actuator) is stopped to initiate P-control or PD-control.

In the above-described embodiments, it is conceivable that the first actuator is a servo motor for a rudder, the second actuator is a servo motor for an aileron, and the third actuator is a servo motor for an elevator. For example, the aileron/elevator is operated when turning, wherein the integral element is reduced or cut for the rudder.

In the above-described embodiments, it is further conceivable that first actuator is a servo motor for an elevator, and the second actuator is a servo motor for an aileron. For example, when operating the aileron during landing, the integral element is reduced or cut for the elevator.

The wireless controlled airplane or arithmetic processing device according to the present invention is provided so that when the second or third actuator has been operated while performing the PID control for the first actuator, the integral element in the PID control is reduced or cut for the first actuator. This enables an enhanced pose control to be temporarily attenuated, which can eliminate unnatural behaviors e.g. during turning to be eliminated and achieve an easier control.

DETAILED DESCRIPTION OF THE PREFERRED EMBODIMENTS

Figure 1:
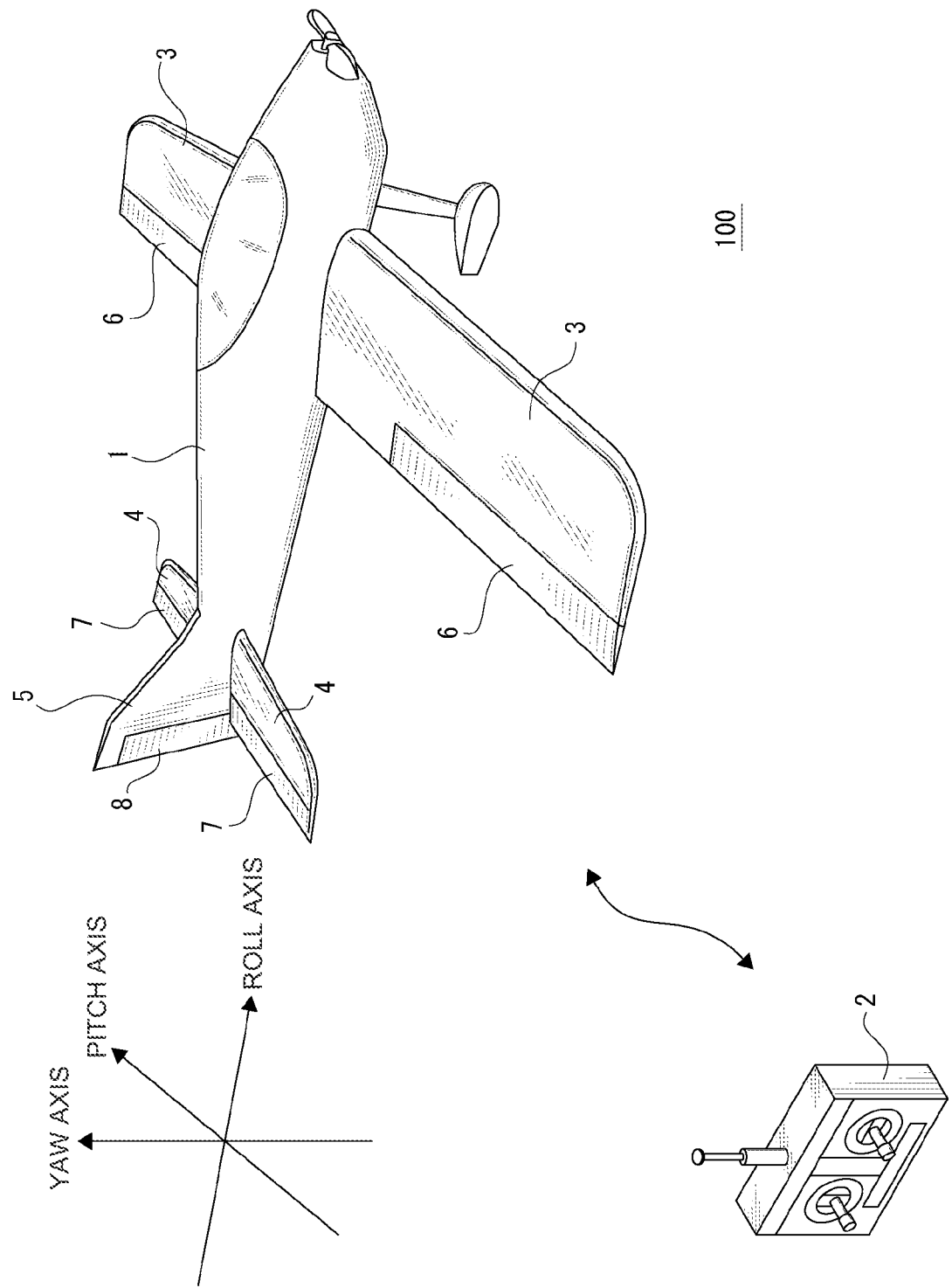
FIG. 1 is an explanatory view of a flight control system according to an embodiment of the present invention.

Hereinafter, an embodiment of the present invention will be described in the following points in this sequence:

<1. Summary of a Flight Control System>
<2. Configuration of a Wireless Controlled Airplane>
<3. First Embodiment>
<4. Second Embodiment>
<5. Conclusion and Exemplar Variations>

It is to be noted that the following description will refer to the Drawings which show only features which are essential for the present invention. The Drawings are merely schematic, wherein a relation between a thickness and a plan dimension of each of the features as well as their ratio and others are merely illustrative. Furthermore, the features shown in the Drawings may be modified in various manners e.g. depending on the design within a scope which does not depart from the technical idea of the present invention. It is to be further noted that features and/or processes which have been described once may be designated with same reference signs and repeating the corresponding description may be omitted in the following description. Furthermore, it is to be understood that the present invention is not limited to the following embodiment, but includes modifications and/or alterations etc. which fall within a scope that may achieve the objective of the present invention.

1. Summary of a Flight Control System

Now, a summary of a flight control system 100 according to the present embodiment will be described with reference to FIG. 1. For example, the flight control system 100 is constituted with a wireless controlled airplane 1 and a control device 2. In the following description, an axis extending through an airframe of the wireless controlled airplane 1 from a front side to a back side shall be a roll axis. Further, an axis extending the airframe from an upper side to a lower side shall be a yaw axis. Furthermore, an axis extending the airframe from the right to the left shall be a pitch axis.

The wireless controlled airplane 1 is capable of wireless communication with the control device 2 and configured to perform various actions depending on input operation to the control device 2 by an operator. The wireless controlled airplane 1 is provided e.g. with main wings 3, horizontal tails 4, and vertical tails 5. The main wings 3 include ailerons 6 which are operated e.g. for rotating the airframe around the roll axis. Furthermore, the horizontal tails 4 include elevators 7 which are operated e.g. for rotating the airframe around the pitch axis. Moreover, the vertical tails 5 include rudders 8 which are operated e.g. for rotating the airframe around the yaw axis. A flight pose of the wireless controlled airplane 1 can be changed by operating the ailerons 6, elevators 7 and rudders 8.

2. Configuration of a Wireless Controlled Airplane

Figure 2:
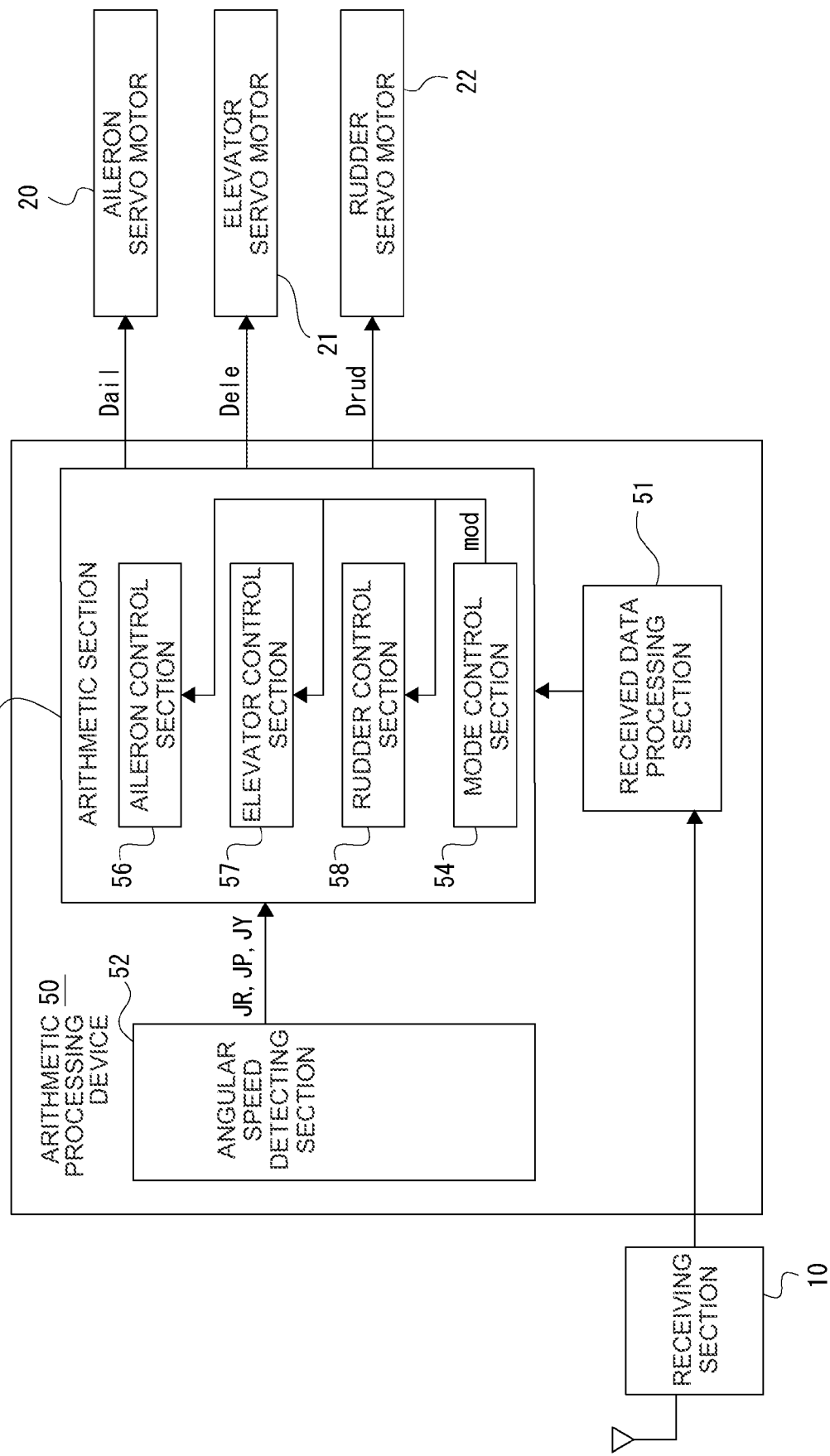
FIG. 2 is a block diagram of a structure of a wireless controlled airplane according to an embodiment.

A configuration of the wireless controlled airplane 1 will be described with reference to FIG. 2. The wireless controlled airplane 1 includes a receiving section 10, an aileron servo motor(s) 20, an elevator servo motor(s) 21, a rudder servo motor(s) 22 and an arithmetic processing device 50.

The receiving section 10 receives a modulation signal, such as an operation signal related to an operation amount of each of the servo motors and/or an operation signal related to a control mode, wherein the operation signal related to the operation amount is based on operation by the operator and received from the control device 2, wherein the receiving section 10 provides the decoded operation signal to the arithmetic processing device 50.

The aileron servo motor 20 operates the aileron 6 as shown in FIG. 1 based on a driving control signal from the arithmetic processing device 50 e.g. for rotating the wireless controlled airplane 1 around the roll axis. The elevator servo motor 21 operates the elevator 7 based on a driving control signal from the arithmetic processing device 50 e.g. for rotating the wireless controlled airplane 1 around the pitch axis. The rudder servo motor 22 operates the rudder 8 based on a driving control signal from the arithmetic processing device 50 e.g. for rotating the wireless controlled airplane 1 around the yaw axis.

The arithmetic processing device 50 includes a received data processing section 51, an angular speed detecting section 52 and an arithmetic section 53. The received data processing section 51 decodes the operation signal provided by the receiving section 10, and outputs information about contents of the various identified signals to the arithmetic section 53.

The angular speed detecting section 52 includes e.g. a roll axis angular speed sensor for detecting an angular speed of rotation around the roll axis (roll axis angular speed JR), a pitch axis angular speed sensor for detecting an angular speed of rotation around the pitch axis (pitch axis angular speed JP), and a yaw axis angular speed sensor for detecting an angular speed of rotation around the yaw axis (yaw axis angular speed JY). In more details, the angular speed detecting section 52 may be formed by a so-called three-axis gyroscope. The angular speed detecting section 52 outputs data of the roll axis angular speed JR, pitch axis angular speed JP and yaw axis angular speed JY detected by the various angular speed sensors, to the arithmetic section 53.

For example, the arithmetic section 53 is constituted with a microcomputer having e.g. a CPU (Central Processing Unit), ROM (Read Only Memory), RAM (Random Access Memory), and has arithmetic functions as a mode control section 54, an aileron control section 56, an elevator control section 57, and a rudder control section 58.

For example, the mode control section 54 performs a switching control between a normal control mode and a PID control mode. In the present example, the normal control mode shall refer to control e.g. with P (proportional element) and D (derivative element). Alternatively, the normal control mode may be provided e.g. for control only with P (proportional element). This means that the normal control mode according to the present embodiment is defined as control without I (integral element). On the other hand, the PID control mode is provided for performing control with P (proportional element), I (integral element) and D (derivative element). Switching between the normal control mode and the PID control mode may be accomplished via mode operation by a user by using a control device 2. The mode control section 54 outputs a mode control signal mod to the aileron control section 56, the elevator control section 57, and/or the rudder control section 58 depending on a mode operation signal by the user.

The aileron control section 56 generates an aileron actuation signal Dail by means of the PID control mode or normal control mode depending on an aileron operation amount by the operator and/or on a roll axis angular speed JR, and provides the aileron actuation signal Dail to the aileron servo motor 20 to operate the aileron 6. The elevator control section 57 generates an elevator actuation signal Dele by means of the PID control mode or normal control mode depending on an elevator operation amount by the operator and/or on a pitch axis angular speed JP, and provides the elevator actuation signal Dele to the elevator servo motor 21 to operate the elevator 7. The rudder control section 58 generates a rudder actuation signal Drud by means of the PID control mode or normal control mode depending on a rudder operation amount by the operator and/or on a yaw axis angular speed JY, and provides the rudder actuation signal Drud to the rudder servo motor 22 to operate the rudder 8.

3. First Embodiment

As a first embodiment, a configuration will be described in which a first actuator control section for a first actuator reduces an integral element of the PID control depending on an operation signal for the second/third actuator control section.

Figure 3:
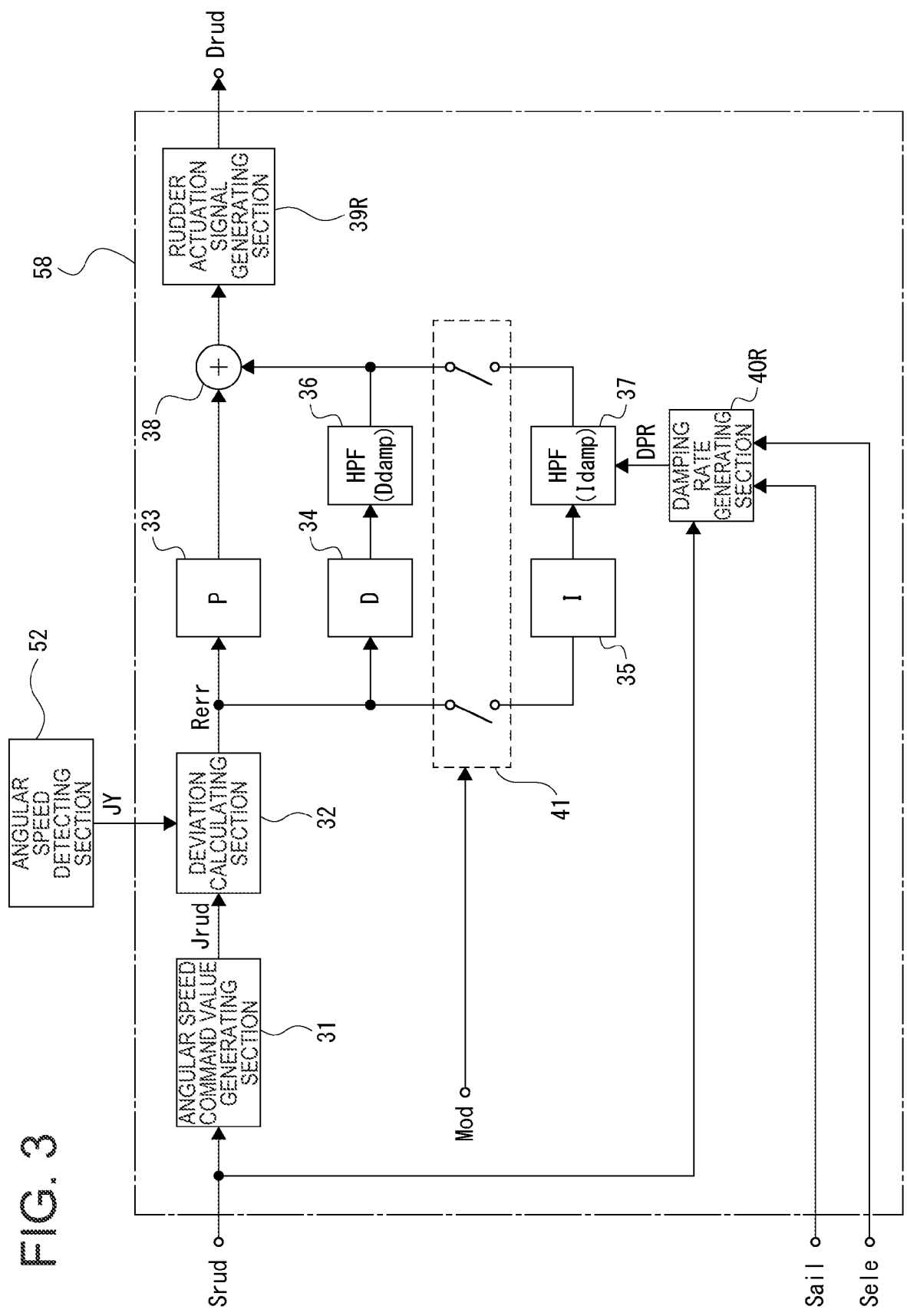
FIG. 3 is a block diagram of a structure of a rudder control section according to a first embodiment.

FIG. 3 shows the rudder control section 58 as an example for the first actuator control section. This means that FIG. 3 assumes that the rudder servo motor 22 is the first actuator. The rudder control section 58 includes an angular speed command value generating section 31, a deviation calculating section 32, a P-control calculating section 33, a D-control calculating section 34, an I-control calculating section 35, HPFs (high pass filters) 36 and 37, a combination section 38, a rudder actuation signal generating section 39R, a damping rate generating section 40R, and a mode switch 41.

The control device 2 transmits a rudder operation signal Srud which is demodulated in the receiving section 10 and decoded in the received data processing section 51. This rudder operation signal Srud is then inputted to the angular speed command value generating section 31. In the control device 2, an operation amount, such as an operation amount of a rudder operating lever e.g. by a potentiometer, is encoded, modulated and then wirelessly transmitted. Accordingly, the rudder operation signal Srud which is demodulated, decoded and inputted includes information which represents the operation amount of the rudder operation. This information is converted into angular speed information Jrud in the angular speed command value generating section 31.

This angular speed information Jrud and the yaw axis angular speed JY from the angular speed detecting section 52 are provided to the deviation calculating section 32. In the deviation calculating section 32, a deviation Rerr between the angular speed information Jrud and the yaw axis angular speed JY is determined.

When the user performs operation for selecting the PID control mode, the mode switch 41 is switched on by the mode control signal mod from the mode control section 54. In this manner, the deviation Rerr determined in the deviation calculating section 32 is provided to each of the P-control calculating section 33, the D-control calculating section 34 and the I-control calculating section 35.

For example, the P-control calculating section 33 multiplies the deviation Rerr with a predetermined proportional gain Pgain to obtain a proportional control amount Pt at a time t. This means Pt=Rerr·Pgain.

For example, the D-control calculating section 34 multiplies a derivative value with a predetermined derivative gain Dgain to obtain a derivative control amount Dt at the time t, wherein the derivative value is obtained by differentiating the deviation Rerr. Here, it is to be noted that the obtained derivative control amount Dt is damped in the HPF 36 by being filtered at a predetermined cut-off frequency. A purpose thereof is to prevent a response by the derivative element from becoming too large.

For example, the I-control calculating section 35 multiplies an integral value with a predetermined integral gain Igain to obtain an integral control amount It at the time t, wherein the integral value is obtained by integrating the deviation Rerr. Here, it is to be noted that the obtained integral control amount It is damped in the HPF 37 by being filtered with an HPF coefficient (cut-off frequency), wherein the HPF coefficient corresponds to a damping rate DPR which is set by the damping rate generating section 40R. Thus, It=Rerr·Igain+ΣIt−1·Idamp. Here, "It−1" is an I-control amount for a directly previous sample, and "Idamp" is the filter coefficient of the HPF 37 which is configured to be variably set depending on the damping rate DPR. The HPF 37 is provided for resetting an offset which remains for an infinite time due to the I-control.

The proportional element (proportional control amount Pt), derivative element (derivative control amount Dt), integral element (integral control amount It) which are thus obtained at a time t are combined with each other in the combination section 38 to provide a combined control amount to the rudder actuation signal generating section 39R. The rudder actuation signal generating section 39R generates the rudder actuation signal Drud corresponding to the combined control amount, and outputs it to the rudder servo motor 22.

When the user instructs the normal control mode, the mode switch 41 is switched off via the mode control signal mod. Thus, the deviation Rerr determined in the deviation calculating section 32 is not provided to the I-control calculating section 35, but to each of the P-control calculating section 33 and D-control calculating section 34. In this case, the proportional element (proportional control amount Pt) and the derivative element (derivative control amount Dt) are combined with each other in the combination section 38 to generate the combined control amount, wherein the rudder actuation signal generating section 39R generates the rudder actuation signal Drud corresponding to the combined control amount to output it to the rudder servo motor 22.

In the normal control mode, the rudder actuation signal Drud may be generated only based on the proportional element (proportional control amount Pt).

Hereinafter, damping the integral control amount It will be described which is performed by the HPF 37 in the rudder control section 58 as described above in the PID control mode. The rudder operation signal Srud is inputted to the damping rate generating section 40R, wherein an offset amount is reset by setting the damping rate depending on the rudder operation amount in the above-described manner. In addition, the damping rate generating section 40R receives the aileron operation signal Sail and the elevator operation signal Sele.

For example, as the damping rate DPR to be actually set for the HPF 37, the damping rate generating section 40R defines a value which is obtained by multiplying a damping rate DPR(Srud) corresponding to the rudder operation signal Srud with a damping rate DPR(Sail) corresponding to the aileron operation signal Sail and/or a damping rate DPR (Sele) corresponding to the elevator operation signal Sele. This means that the damping rate DPR to be set for the HPF 37 is defined as follows:

$$DPR=DPR(Srud) \cdot DPR(Sail)) \cdot DPR(Sele).$$

In this manner, it is configured such that a damping amount of the integral control amount It for the rudder control is increased depending on the elevator operation amount and/or aileron operation amount. Such configuration allows impact of the integral element to be reduced more quickly when the aileron and/or elevator is manipulated for turning while the rudder control is being performed depending on the yaw axis angular speed JY which is detected by the angular speed detecting section 52 in the PID control mode.

In more details, user manipulation for turning is performed as follows:

(1) The aileron is manipulated to tilt an airframe to a target angle;
(2) Once the target angle has been reached, the manipulation of the aileron is returned to neutral;
(3) In the case of a front side, upward manipulation is performed as elevator manipulation, while in the case of a back side, downward manipulation is performed as the elevator manipulation;
(4) Once the airframe has been oriented in a target forwarding direction, the elevator manipulation is returned to neutral; and
(5) The aileron is manipulated to bring the airframe back to a horizontal state.

In the course of a series of manipulations as described above, the damping rate DPR is increased depending on the operation amount for the aileron or elevator when it is manipulated, wherein the cut-off frequency for the HPF 37 is increased. For example, this virtually disables the integral control amount It to temporarily establish the PD control state (a state similar to the normal control mode). This brings a manipulation feeling felt by the user, closer to a manipulation feeling felt in the normal control mode.

When the aileron 6 and/or elevator 7 is manipulated for turning, the rudder 8 is controlled based on the yaw axis angular speed JY. If the PID control is being performed at this time, it is difficult to bring the rudder 8 back to its previous state due to being affected by the integral control amount It. As a result, turning by the aileron manipulation and the elevator manipulation may lead to an unnatural behavior which is not intended by the user. For eliminating this, it is necessary to perform the rudder manipulation according to the manipulation process as described in above (1) to (5). Unlike the above-described situation, the configuration according to FIG. 3 is provided such that the integral control amount It is reduced by the aileron manipulation and the elevator manipulation. Consequently, the rudder 8 is returned to its previous state relatively quickly, despite of being driven via the yaw axis angular speed JY. This stabilizes the turning action.

When the PID control is being performed and the operator should perform turning by manipulating the aileron 6 and/or elevator 7, it is possible to prevent unnatural behaviors by the operator manipulating the rudder 8 finely and precisely. However, this rudder manipulation is extremely difficult even for experienced pilots. On the other hand, when the aileron 6 and/or elevator 7 should be manipulated for turning, such unnatural behaviors at the time of turning is eliminated by automatically reducing the integral element associated to the rudder 8. This can solve e.g. the phenomena that it is not possible to perform turning in a direction and/or along a course which is expected by the operator. In this manner, it is possible to perform a stable flight via the PID control while simultaneously enabling a stable turning flight without making corresponding turning manipulations difficult.

Next, another configuration will be described by means of the elevator control section 57 as an example, wherein this configuration is also presented as the first embodiment. In this configuration, the first actuator control section for controlling the first actuator is configured to reduce the integral element in the PID control depending on the operation signal for the second/third actuator control section.

Figure 4:
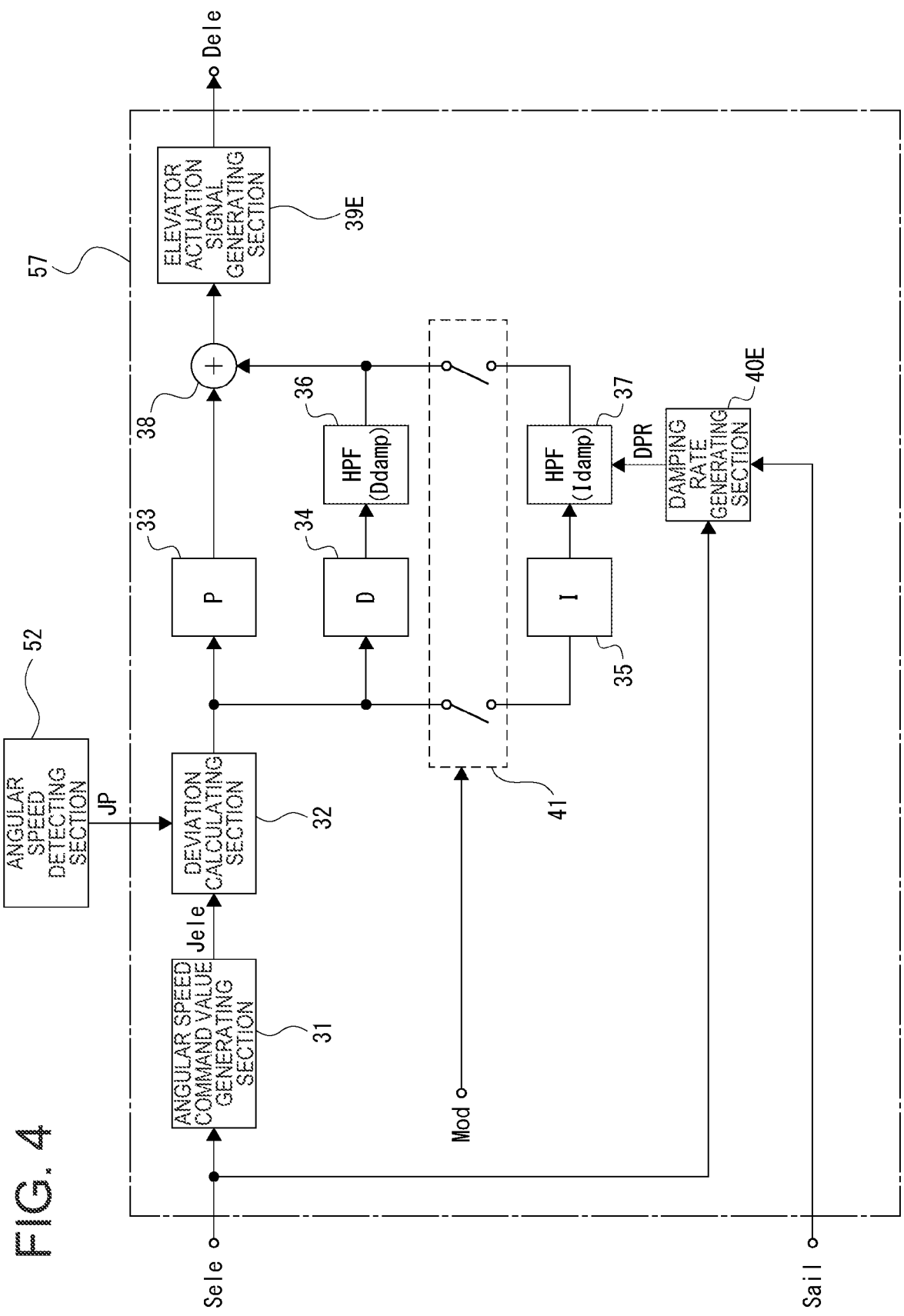
FIG. 4 is a block diagram of a structure of an elevator control section according to the first embodiment.

FIG. 4 shows the elevator control section 57 as an example for the first actuator control section. This means that FIG. 4 assumes that the elevator servo motor 21 is the first actuator. The elevator control section 57 is configured substantially in the same manner as the rudder control section 58, except for the following differences:

The elevator operation signal Sele is inputted to the angular speed command value generating section 31, in which the elevator operation signal Sele is converted into angular speed information Jele. The angular speed information Jele and the pitch axis angular speed JP from the angular speed detecting section 52 are supplied to the deviation calculating section 32. The deviation Rerr between the angular speed information Jele and the yaw axis angular speed JY is determined in the deviation calculating section 32.

Since the mode switch 41 is switched on in the PID control mode, the deviation Rerr determined in the deviation calculating section 32 is provided to each of the P-control calculating section 33, D-control calculating section 34 and the I-control calculating section 35. Then, the proportional control amount Pt, the derivative control amount Dt and the integral control amount It are combined by the combination section 38 to obtain a combined control amount, wherein the elevator actuation signal generating section 39E generates the elevator actuation signal Dele corresponding to the combined control amount, and outputs it to the elevator servo motor 21.

In the normal control mode, the mode switch 41 is switched off, wherein the deviation Rerr determined in the deviation calculating section 32 is supplied to each of the P-control calculating section 33 and D-control calculating section 34. Then, the proportional control amount Pt and the derivative control amount Dt is combined by the combination section 38 to obtain the combined control amount, the elevator actuation signal generating section 39E generates an elevator actuation signal Dele corresponding to the combined control amount, and outputs it to the elevator servo motor 21.

In the elevator control section 57 as described above, the integral control amount It is damped by the HPF 37 in the PID control mode. The elevator operation signal Sele is inputted to the damping rate generating section 40E, wherein the damping rate is set depending on the elevator operation amount. In addition, the damping rate generating section 40E receives the aileron operation signal Sail. For example, as the damping rate DPR to be actually set for the HPF 37, the damping rate generating section 40E thereafter defines a value which is obtained by multiplying the damping rate DPR(Sele) corresponding to the elevator operation signal Sele with the damping rate DPR(Sail) corresponding to the aileron operation signal Sail. This means that the damping rate DPR to be set for the HPF 37 is defined as follows:

$$DPR=DPR(Sele) \cdot DPR(Sail).$$

In this manner, it is configured such that a damping amount of the integral control amount It for the elevator control is increased depending on the aileron operation amount. In this manner, for example when landing, reduction of the integral control amount It in the PID control of the elevator depending on the aileron operation amount allows to achieve the effects that an offset due to the integral element does not remain in the elevator 7, which makes it difficult to cause deceleration.

4. Second Embodiment

Figure 5:
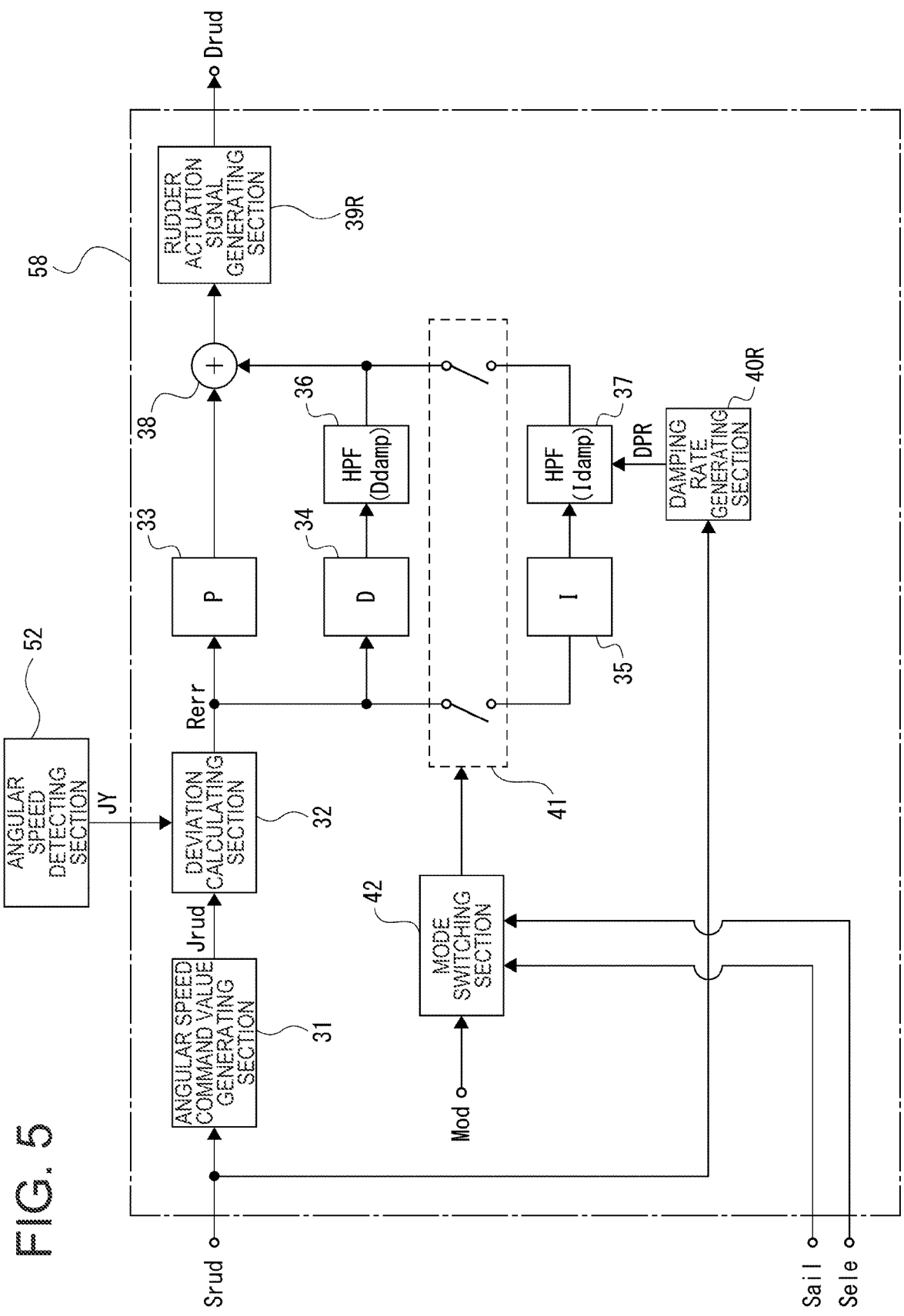
FIG. 5 is a block diagram of a structure of a rudder control section according to a second embodiment.

As a second embodiment, a configuration will be described in which a first actuator control section for a first actuator cuts an integral element of the PID control depending on an operation signal for the second/third actuator control section. FIG. 5 shows the rudder control section 58 as an example for the first actuator control section. The configuration according to FIG. 5 differs from the example according to FIG. 3 in the following points:

The rudder operation signal Srud is inputted to the damping rate generating section 40R, wherein the damping rate DPR is set depending on the rudder operation amount. This means that the damping rate DPR to be set for the HPF 37 is defined as follows:

$$DPR=DPR(Srud).$$

In the case of FIG. 5, the mode switching section 42 for controlling the mode switch 41 is provided. The mode switching section 42 switches the mode switch 41 on/off depending on the mode control signal mod. In addition, the aileron operation signal Sail, elevator operation signal Sele are also inputted to the mode switching section 42. Then, when the aileron operation signal Sail or elevator operation signal Sele has been detected during the PID control mode, the mode switching section 42 controls the mode switch 41 to switch it off.

Therefore, for example, when the aileron 6 and/or the elevator 7 is being driven by the manipulation of (1) to (5) as described above e.g. during turning, a state of PD control is established in which the integral control amount It is temporarily cut. This means that during the PID control mode, the normal control mode is established temporarily with respect to the rudder 8 depending on the aileron operation and/or elevator operation. Similarly to the example of FIG. 3, this prevents unnatural behaviors during turning.

It is to be noted that the normal control mode may be configured as P-control, instead of PD-control, wherein in the PID-control mode, the P-control may be initiated temporarily with respect to the rudder 8 depending on the aileron operation and/or elevator operation.

The mode switch 41 according to FIG. 5 is configured to switch both of input and output switches for the I-control calculating section 35 and HPF 37. However, for example as control in response to the aileron operation signal Sail or elevator operation signal Sele being detected, only the output switch in the mode switch 41 may be controlled to be switched off. This means that in this example, the integral element is temporarily prevented from being reflected while continuing the calculation of the integral control amount.

Also in the elevator control section 57 as shown in FIG. 4, the corresponding features of the second embodiment of FIG. 5 may be applied such that it is configured to temporarily initiate the PD-control or P-control depending on the aileron operation in the PID control mode.

5. Conclusion and Exemplar Variations

As described above, the wireless controlled airplane 1 according to the first embodiment includes the receiving section 10 configured to receive the first operation signal for the first actuator, the second operation signal for the second actuator, and the third operation signal for the third actuator, wherein the first, second and third operation signals are provided as operation signals wirelessly transmitted, wherein the wireless controlled airplane further includes the first actuator control section configured to generate the actuation signal for the first actuator by means of PID control. Further, the first actuator control section is configured to reduce the integral element in the PID control depending on the operation value for the second operation signal or third operation signal. PID control increases e.g. the stability of an airframe during flight, however, this may cause unnatural behaviors for certain actions. When manipulation of one or more of the rudder 8, aileron 6 and elevator 7 as actuators is initiated for such a certain action (one or more of these actuators is steered), the integral element is reduced in the PID control of an actuator which is not steered, which enables unnatural states to be prevented in the current flight action.

In the example of FIG. 3, the first actuator is the rudder servo motor 22, the second actuator is the aileron servo motor 20, and the third actuator is an elevator servo motor 21. Further, in the example of FIG. 4, the first actuator is the elevator servo motor 21, and the second actuator is the aileron servo motor 20. In each of these cases, reducing the integral element in PID control can eliminate unnatural flight behaviors or increase the stability of landing. It is also conceivable that the first actuator is the aileron servo motor 20.

In the second embodiment, the case has been described in which the first actuator control section is configured to perform switching to the control without the integral element from the PID control depending on operation of the second operation signal or third operation signal. Likewise, it is possible to eliminate unnatural flight behaviors by temporarily deactivating the PID control for an actuator which is not steered, i.e. by cutting the corresponding integral element for such an actuator.

In the example of FIG. 5, the first actuator is the rudder servo motor 22, the second actuator is the aileron servo motor 20, and the third actuator is an elevator servo motor 21. The present invention is not limited thereto, but it is also preferable that the first actuator may be the elevator servo motor 21, and the second actuator may be the aileron servo motor 20. Further, it is conceivable that the first actuator is the aileron servo motor 20.

The effects of the present embodiments described above can be more remarkably achieved in a so-called model airplane with fixed wings than a flight body having rotary wings such as a helicopter.

It is further to be noted that the arithmetic processing device 50 of the embodiments is an example for the arithmetic processing device according to the present invention. By providing the arithmetic processing device 50 as described above, it is facilitated to realize a wireless controlled airplane with excellent pose control of an airframe.

REFERENCE SIGNS LIST

1 Wireless controlled airplane
2 Control device
6 Aileron
7 Elevator
8 Rudder
10 Receiving section
20 Aileron servo motor
21 Elevator servo motor
22 Rudder servo motor
31 Angular speed command value generating section
32 Deviation calculating section
33 P-control calculating section
34 D-control calculating section
35 I-control calculating section
36, 37 HPFs
38 Combination section
39R Rudder actuation signal generating section 39E Elevator actuation signal generating section
40R, 40E Damping rate generating section
41 Mode switch
42 Mode switching section
50 Arithmetic processing device
56 Aileron control section
57 Elevator control section
58 Rudder control section

What is claimed is:

1. A wireless controlled airplane comprising:
a receiver configured to receive a rudder operation signal for a servo motor for a rudder, an aileron operation signal for a servo motor for an aileron, and an elevator operation signal for a servo motor for an elevator, wherein the rudder operation signal, aileron operation signal and elevator operation signals are provided as operation signals wirelessly transmitted; and
a rudder control section configured to generate an actuation signal for the servo motor for the rudder by means of PID control,
wherein the rudder control section is configured to reduce an integral element in the PID control depending on an operation value for the aileron operation signal or the elevator operation signal.

2. A wireless controlled airplane comprising:
a receiver configured to receive an elevator operation signal for a servo motor for an elevator, an aileron operation signal for a servo motor for an aileron, and a rudder operation signal for a servo motor for a rudder, wherein the elevator operation signal, aileron operation signal and rudder operation signal are provided as operation signals wirelessly transmitted; and
an elevator control section configured to generate an actuation signal for the servo motor for the elevator by means of PID control,
wherein the elevator control section is configured to reduce an integral element in the PID control depending on an operation value for the aileron operation signal or the rudder operation signal.

3. An arithmetic processing device for a wireless controlled airplane, wherein the wireless controlled airplane is configured to receive a rudder operation signal for a servo motor for a rudder, an aileron operation signal for a servo motor for an aileron, and an elevator operation signal for a servo motor for an elevator, the rudder operation signal, aileron operation signal and elevator operation signals being provided as operation signals wirelessly transmitted, the arithmetic processing device comprising:
a rudder control section configured to generate an actuation signal for the servo motor for the rudder by means of PID control,
wherein the rudder control section is configured to reduce an integral element in the PID control depending on an operation value for the aileron operation signal or the elevator operation signal.

4. An arithmetic processing device for a wireless controlled airplane, wherein the wireless controlled airplane is configured to receive an elevator operation signal for a servo motor for an elevator, an aileron operation signal for a servo motor for an aileron, and a rudder operation signal for a servo motor for a rudder, the elevator operation signal, aileron operation signal and rudder operation signal being provided as operation signals wirelessly transmitted, the arithmetic processing device comprising:
an elevator control section configured to generate an actuation signal for the servo motor for the elevator by means of PID control,
wherein the elevator control section is configured to reduce an integral element in the PID control depending on an operation value for the aileron operation signal or the rudder operation signal.

5. A wireless controlled airplane comprising:
a receiver configured to receive an aileron operation signal for a servo motor for an aileron, an elevator operation signal for a servo motor for an elevator, and a rudder operation signal for a servo motor for a rudder, wherein the aileron operation signal, elevator operation signal and rudder operation signal are provided as operation signals wirelessly transmitted; and
an aileron control section configured to generate an actuation signal for the servo motor for the aileron by means of PID control,
wherein the aileron control section is configured to reduce an integral element in the PID control depending on an operation value for the elevator operation signal or the rudder operation signal.

6. An arithmetic processing device for a wireless controlled airplane, wherein the wireless controlled airplane is configured to receive an aileron operation signal for a servo motor for an aileron, an elevator operation signal for a servo motor for an elevator, and a rudder operation signal for a servo motor for a rudder, the aileron operation signal, elevator operation signal and rudder operation signal being provided as operation signals wirelessly transmitted, the arithmetic processing device comprising:
an aileron control section configured to generate an actuation signal for the servo motor for the aileron by means of PID control,
wherein the aileron control section is configured to reduce an integral element in the PID control depending on an operation value for the elevator operation signal or the rudder operation signal.

* * * * *

UNITED STATES PATENT AND TRADEMARK OFFICE
CERTIFICATE OF CORRECTION

| | |
|---|---|
| PATENT NO. | : 12,109,507 B2 |
| APPLICATION NO. | : 17/500670 |
| DATED | : October 8, 2024 |
| INVENTOR(S) | : Masahiro Tanaka |

It is certified that error appears in the above-identified patent and that said Letters Patent is hereby corrected as shown below:

In the Claims

Column 11, Claim 1, Line 18, "signals" should be --signal--.

Column 11, Claim 3, Line 47, "signals" should be --signal--.

Signed and Sealed this
Third Day of December, 2024

Katherine Kelly Vidal
*Director of the United States Patent and Trademark Office*